United States Patent
Miller et al.

(10) Patent No.: US 7,812,260 B2
(45) Date of Patent: Oct. 12, 2010

(54) ELECTRICAL INSULATION TAPE WITH CONTROLLED BONDING AND RESIN IMPREGNATION PROPERTIES

(75) Inventors: Mark L. Miller, Charlotte, NC (US); Franklin T. Emery, Eighty Four, PA (US)

(73) Assignee: Siemens Energy, Inc., Orlando, FL (US)

( * ) Notice: Subject to any disclaimer, the term of this patent is extended or adjusted under 35 U.S.C. 154(b) by 451 days.

(21) Appl. No.: 11/860,718

(22) Filed: Sep. 25, 2007

(65) Prior Publication Data

US 2009/0078450 A1   Mar. 26, 2009

(51) Int. Cl.
*H01B 7/00* (2006.01)
(52) U.S. Cl. .................................. 174/120 R
(58) Field of Classification Search ............. 174/120 R, 174/120 SR
See application file for complete search history.

(56) References Cited

U.S. PATENT DOCUMENTS

| 3,930,915 | A |  | 1/1976 | Mendelsohn et al. |
|---|---|---|---|---|
| 3,998,983 | A |  | 12/1976 | Smith |
| 4,085,250 | A |  | 4/1978 | Smith |
| 4,091,139 | A |  | 5/1978 | Quirk |
| 4,157,414 | A |  | 6/1979 | Smith |
| 4,376,904 | A |  | 3/1983 | Horrigan |
| 4,513,059 | A |  | 4/1985 | Dabroski |
| 4,661,397 | A |  | 4/1987 | Kwiecinski et al. |
| 6,140,733 | A | * | 10/2000 | Wedde et al. ............... 310/196 |
| 6,361,632 | B1 |  | 3/2002 | Emery |
| 6,677,848 | B1 |  | 1/2004 | Emery |
| 6,724,118 | B2 |  | 4/2004 | Emery |
| 7,135,639 | B2 |  | 11/2006 | Emery |

FOREIGN PATENT DOCUMENTS

| JP | 54087802 A | 7/1979 |
|---|---|---|
| JP | 11215754 A | 8/1999 |

OTHER PUBLICATIONS

Database WPI Week 199942, Thomson Scientific, London, GB; 1999-501273; XP002517564.
Database WPI Week 197934, Thomson Scientific, London, GB; 1979-62290B; XP002517565.

* cited by examiner

*Primary Examiner*—Chau N Nguyen

(57) ABSTRACT

A mechanical interface for relieving stress between an outer layer and an inner insulating layer in a layered insulating tape structure surrounding an electrical conductor. The interface tape includes a porous non-woven carrier having opposing sides including a release region located at a first side and a non-release region located at an opposite second side. The release region is treated with a release material for substantially inhibiting adhesion between the first side and an adjacent outer surface. The non-release region is untreated by the release material for substantially facilitating adhesion between the second side and an adjacent inner surface.

19 Claims, 2 Drawing Sheets

ELECTRICAL INSULATION TAPE WITH CONTROLLED BONDING AND RESIN IMPREGNATION PROPERTIES

FIELD OF THE INVENTION

The present invention relates in general to the field of an electrical insulation tape and, more particularly, to a mechanical isolation layer arranged to relieve stress within an insulating tape structure for a stator coil in a generator.

BACKGROUND OF THE INVENTION

High-voltage windings are used in various dynamoelectric machines, such as motors or generators. For example, high-voltage windings commonly referred to as stator windings are used in high-voltage electrical generators. A high-voltage winding, such as a stator winding, can be formed from at least one winding bar that, in turn, comprises one or more electrical conductors. The electrical conductors individually are formed of a highly conductive material, such as copper. The electrical conductors are ordinarily individually-insulated and bundled together to form the winding bar. The bundle, in turn, is surrounded by insulation, often referred to as a winding insulator or groundwall insulator. The groundwall insulator can be a single-sided epoxy resin/mica paper tape wrapping, usually comprising multiple layers of a glass-backed mica-tape.

Overlaying the groundwall is an outer conductive ground electrode that surrounds the groundwall insulator. The outer conductive ground electrode can be a coating of conductive paint or a wrapped conductive tape over the groundwall insulator. The outer conductive ground electrode is connected to ground so that the voltage of the outer surface of the high-voltage winding is at ground potential.

The tape may be applied half lapped, abutted or in any other suitable manner. Generally, multiple layers of the mica tape are wrapped about the coil with sixteen or more layers generally being used for high voltage coils. The number of layers may be decreased depending on the power of the generator and the effectiveness of the insulator in both its abilities to insulate electrically and conduct heat. To impart better abrasion resistance and to secure a tighter insulation, a wrapping of an outer tape of a tough fibrous material, for example, glass fiber, asbestos or the like may be applied to the coil.

Therefore, what is referred to as insulating tape is actually composed of multiple layers of tape that have different properties. The inner-most layer is referred to as the groundwall insulation. Wrapped around this is the conductive layer. The conductive layer provides a low resistance and doesn't allow voltage to be present between the outer coil surface and the core.

The insulating tape is generally impregnated with a resin to improve many of its overall properties. There are many methods of coating materials with epoxy resins and then curing the product, One such method is vacuum pressure impregnation (VPI). This method is used on devices such as stator conductor coils. A mica/glass insulating tape is applied to the coils, then the coils are placed in a vacuum vessel and a vacuum is applied. After a period of time, resin is admitted to impregnate the coils. Pressure is applied to force the resin in and minimize voids, which will affect conductivity. After this is completed, the coils are heated to cure the resin. A variation of this, global VPI (GVPI) involves the process where dry insulated coils are wound, and then the whole stator is vacuum pressure impregnated rather than the individual coils.

If the conductor is not secure against the generator assembly, electric discharge will result. This adversely affects the performance of the machinery, and also causes cumulative damage to the generator, conductor and insulation tape. In order to prevent such a discharge, the conductive layer of the insulating tape itself is typically formed of at least two layers, which are referred to as the outer conductive layer and the inner conductive layer. The outer layer of conductive tape will be in firm contact with the generator core, while the inner conductive layer will be in firm contact with the groundwall insulation. This, however, creates a problem, since the conductor and the generator core often have minor movements independent of one another due to such things as heating and vibration. This is referred to as a difference of movement. If the outer conductive layer of the insulating tape is in firm contact with the generator assembly, and the conductor moves independently of the assembly, stresses are created on the insulating tape.

These stresses may cause the tape to tear, ruining the insulation around the conductor coil. One solution to prevent this comprises providing a slip layer in the insulating tape to provide mechanical isolation between the generator assembly and the electrical conductor. This slip layer is sandwiched between the inner conductive layer, which is in contact with the conductor, and the outer conductive layer, which is in contact with the generator assembly. The slip layer may consist of a mica-filled tape that is interwoven with a conductive tape. The mica-filled slip layer consists primarily of relatively large mica flakes, i.e., mica splittings, typically provided in a mica splittings tape. The large mica flakes are generally larger than those used in other insulating layers. Therefore they are not well bonded together and can slip relative to each other. This slip layer allows for a minor difference of movement between the inner and outer conductive layers, without causing any tears or damage to the tape. In addition, the slip layer also aids in stator coil removal from a wound GVPI stator winding.

This solution, however, is not without its own problems. One concern is that the slip layer, because the mica-filled tape has large flakes, it is delicate and therefore is more susceptible to handling damage. This means that the slip layer, and often the entire insulating layer, has to be wound around the conductor by hand, rather than using more efficient machinery. Also, the amount of slip that the slip layer allows for provides only a moderate difference of movement.

In addition, the current installation of mica splittings tapes provided in GVPI processes is not provided in such a way as to produce dielectric properties since the mica tape is typically applied with a butt joint pattern over the insulated stator coil conductor wire stack in order to allow for easier GVPI resin impregnation. Further, current high quality mica splittings tapes required for high voltage applications are relatively expensive and are not commonly available.

Accordingly, there is a need for a mechanical isolation layer providing a stress reducing interface between an electrical conductor and a generator core that is readily manufactured and is capable of high voltage applications.

SUMMARY OF THE INVENTION

In accordance with one aspect of the invention, a mechanical interface tape is provided for a layered insulating tape structure surrounding an electrical conductor. The interface tape comprises a porous carrier comprising opposing sides including a release region located at a first side and a non-release region located at an opposite second side. The release region is substantially treated with a release material for substantially inhibiting adhesion between the first side and an adjacent outer surface. The non-release region is substantially untreated by the release material for substantially facilitating adhesion between the second side and an adjacent inner surface.

In accordance with another aspect of the invention, a mechanical interface tape is provided for relieving stress between an outer conductive layer and an inner insulating dielectric layer in a layered insulating tape structure surrounding an electrical conductor. The interface tape comprises a porous non-woven carrier comprising opposing sides including a release region located at a first side and a non-release region located at an opposite second side. The release region is substantially treated with a release material for substantially inhibiting adhesion between the first side and an adjacent outer surface. The non-release region is substantially untreated by the release material for substantially facilitating adhesion between the second side and an adjacent inner surface.

BRIEF DESCRIPTION OF THE DRAWINGS

While the specification concludes with claims particularly pointing out and distinctly claiming the present invention, it is believed that the present invention will be better understood from the following description in conjunction with the accompanying Drawing Figures, in which like reference numerals identify like elements, and wherein:

DETAILED DESCRIPTION OF THE INVENTION

In the following detailed description of the preferred embodiment, reference is made to the accompanying drawings that form a part hereof, and in which is shown by way of illustration, and not by way of limitation, a specific preferred embodiment in which the invention may be practiced. It is to be understood that other embodiments may be utilized and that changes may be made without departing from the spirit and scope of the present invention.

Figure 1:
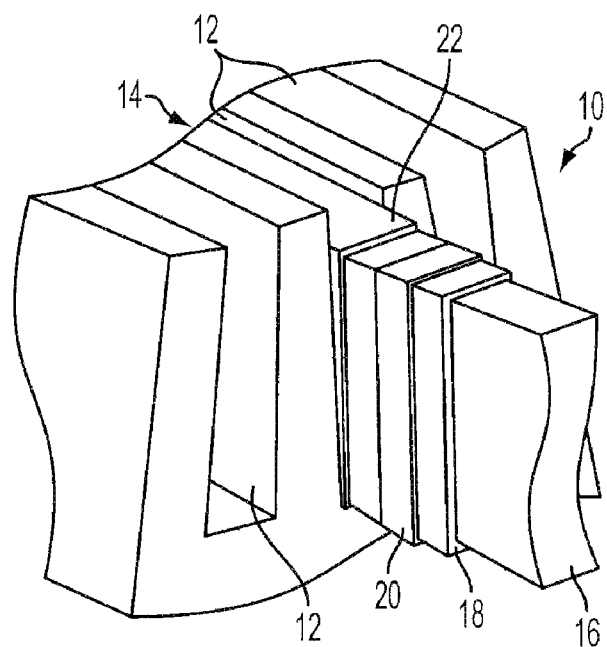
FIG. 1 is a perspective view of a portion of a stator for a generator core and including a partial cut away view of a wrapped stator coil incorporating the mechanical interface tape of the present invention.

Referring to FIG. 1, a portion of a stator 10 for a generator core is illustrated including a plurality of slots 12, where each slot is adapted to receive a wrapped stator coil 14 (only one shown). As additionally seen in FIG. 2, the wrapped stator coil 14 generally includes a stator winding 16 comprising insulated wire strands wrapped to form a conductor bar; a dielectric insulating layer 18, also known as a ground wall, that may generally comprise a glass backed resin impregnated mica paper tape; a mechanical interface layer 20 formed in accordance with the present invention and described further below; and a conductive or a partially conductive outer layer 22 that may be a silicon carbide filled varnish treated glass fabric. The tape forming the dielectric insulating layer 18 comprises a high voltage insulation layer where the tape forming the insulating layer 18 is typically half lap wrapped and firmly attached about the stator winding 16. The outer layer 22 is substantially fixed to the walls of the stator slot 12 by an impregnating bonding resin that is applied after the wrapped stator coil 14 is placed in the slot 12. For example, the impregnating bonding resin may be applied by a global vacuum pressure impregnation (GVPI) process resulting in the bonding resin impregnating through the materials of the wrapped stator coil 14, and substantially affixing the outer layer 22 of the wrapped stator coil 14 to the slot 12.

It is generally desirable to ensure that the ground wall defined by the insulating layer 18 is not disturbed by relative movement between the stator coil 14 and the stator 10, such as may occur as a result thermal expansion and vibration during operation of the generator. Hence, in accordance with the present invention, the mechanical interface layer 20 is located between the outer layer 22 affixed to the stator slot 12 and the insulating layer 18 affixed to the stator winding 16. The interface layer 20 accommodates relative movement between an outwardly facing surface 36 of the insulating layer 18 and an inwardly facing surface 34 of the outer layer 22.

Figure 2:
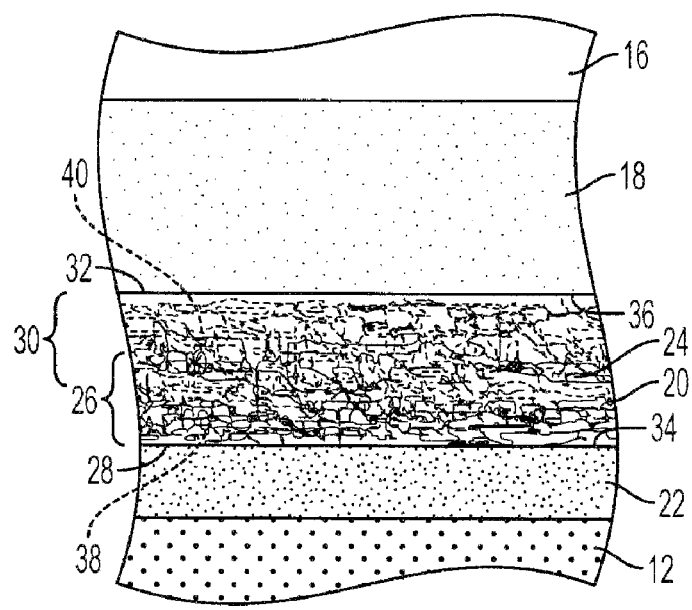
FIG. 2 is a diagrammatic cross-sectional view of the wrapped stator coil shown in FIG. 1.

Referring to FIG. 2, the interface layer 20 is formed to provide at least one side having a non-bonding, low friction characteristic. The interface layer 20 is defined by a tape that is preferably butt wrapped about the insulating layer 181 see also FIG. 1. The interface layer 20 preferably comprises a porous carrier 24 comprising opposing sides including a release region 26 located at a first side 28 and a non-release region 30 located at an opposite second side 32. The release region 26 is substantially treated with a release material 38 for substantially inhibiting adhesion between the first side 28 and an adjacent outer surface defined by the inwardly facing surface 34 of the outer layer 22, and the non-release region 30 is substantially untreated by the release material 38 for substantially facilitating adhesion between the second side 32 and an adjacent inner surface defined by the outwardly facing surface 36 of the insulating layer 18.

The porous carrier 24 preferably comprises a non-woven material. For example, the porous carrier 24 may comprise a polymeric felt, polymeric matte, glass fleece or glass matte materials. With regard to polymeric materials, a high temperature thermoplastic polymer may be provided, such as polymers that are typically made into felt or matte materials, like polyesters, i.e., Dacron®, or aramid materials, i.e., Nomex® and Kevlar®. The preferred polymeric material for the porous carrier 24 is Nomex®. With regard to glass materials, a non-woven glass porous carrier 24 may comprise a light weight glass fleece or matte material formed of an E-Glass, such as is produced for electrical applications. It should be noted that the preferred embodiment may comprise either a glass matte or fleece carrier or a polymeric matte or fleece carrier as the porous carrier 24.

The release material 38 is partially impregnated into the first side 28 of the porous carrier 24. The release material 38 is preferably applied to the porous carrier 24 by a coating process where the release material 38 diffuses into the release region 26 from the first side 28 toward the non-release region 30. The release material 38 permeates into and bonds within the release region 26, while forming an outer non-bonding surface at the first side 28 of the porous carrier 24. The release material 38 preferably comprises a fluorinated resin. For example, an operable release material 38 for use with both polymer and glass porous carriers 24 comprises Teflon-S® Self-Priming ONE-COAT blends of fluoropolymer with other resins, such as is available from E. I. du Pont de Nemours and Company of Wilmington, Del. Other release materials 38 that may be used with non-woven glass, porous carriers 24 include PTFE, FEP, PTFE/PFA, PFA, and ETFE. It should be noted that any high temperature polymer coating with a very low surface energy would generally provide a good low bond strength coating for use as the release material 38.

The second side 32 of the porous carrier 24 is partially impregnated with a binding material comprising an impregnating binding resin. The binding material 40 is preferably applied to the porous carrier 24 by a coating process where the binding material 40 diffuses into the non-release region 30 from the second side 28 toward the release region 26. The binding material 40 permeates into and bonds within the non-release region 30, for increasing the mechanical strength of the porous carrier 24 following a curing step and forming a non-slipping adhesion surface at the second side 32 of the porous carrier 24. The non-slipping surface characteristic at the second side 32 facilitates wrapping of the porous carrier 24 around the insulating layer 18 in that wrapped portions of the porous carrier 24 will remain in position as the second side 32 adheres to the underlying insulating layer 18.

The binding material 40 preferably comprises a thermoset, low viscosity liquid resin including an epoxy based material or a polyester based material, such as is typically used in electrical insulation applications, For example, the binding material 40 may comprise a styrenated epoxy. In the preferred embodiment, the binding material 40 comprises a B-stage resin, where the B-stage resin stiffens and strengthens the porous carrier 24 to further facilitate handling of the porous carrier 24 as it is applied over the insulating layer 18.

Figure 3:
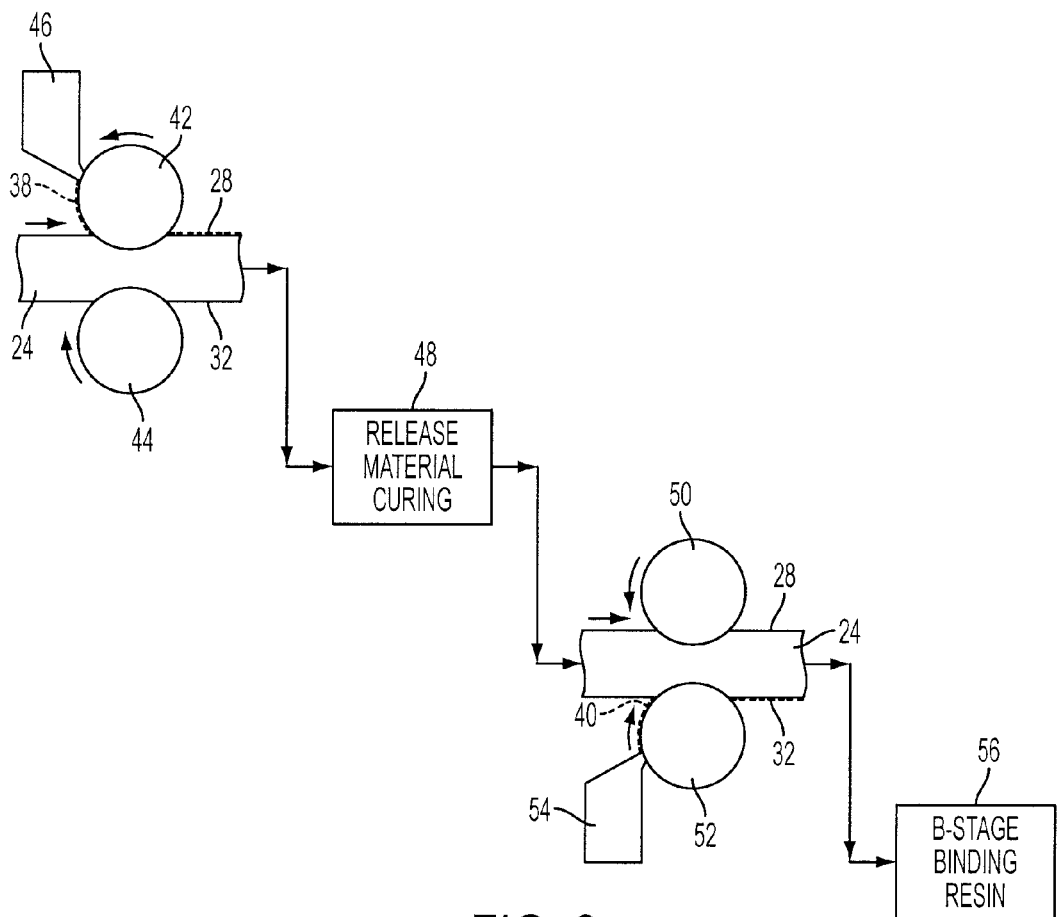
FIG. 3 is a diagrammatic view of a process for producing the mechanical interface tape.
Figure 4:
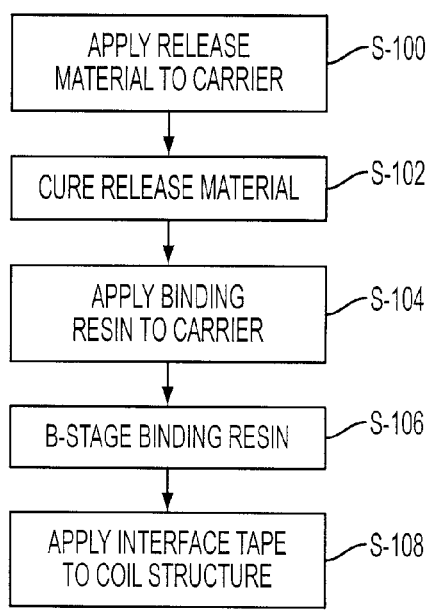
FIG. 4 is a flow diagram of the steps of the process for producing the mechanical interface tape.

Referring to FIGS. 3 and 4, an exemplary process is illustrated for forming the treated porous carrier 24 comprising the release material 38 and the binding material 40. A supply of the porous carrier 24 may be continuously provided from a supply roll (not shown) and conveyed between a pair of rollers 42, 44. A release material supply 46 is associated with the roller 42 and may supply a controlled amount of release material 38 to the surface of the roller 42 for transfer to the first side 28 of the porous carrier 24. The transferred release material 38 coats the first side 28 and diffuses into the porous carrier 24, step S-100 in FIG. 4. The porous carrier 24 treated with the release material 38 is conveyed or transferred to a curing station 48, where the release material 38 is cured by subjecting it to a temperature of approximately 175° C.-250° C., step S-102. The cured release material coated porous carrier 24 is then conveyed between a pair of rollers 50, 52 for application of the binding material 40. A binding material supply 54 is associated with the roller 52 and may supply a controlled amount of binding material 40 to the surface of the roller 52 for transfer to the second side 32 of the porous carrier 24, step S-104. The transferred binding material 40 coats the second side 32 and diffuses into the porous carrier 24. The porous carrier 24 treated with the binding material 40 is conveyed or transferred to a B-stage station 56, where the binding material 40, i.e., a B-stage resin, is partially cured by subjecting it to a temperature of approximately 150° C.-175° C. and for a time of approximately 2-6 hours, step S-106. As noted above, the preferred binding material 40 comprises a B-stage resin and the curing station 56 performs a B-staging process where the B-stage resin is partially cured to provide strengthening properties to the porous carrier 24, and where the final curing of the B-stage resin has not occurred.

It should be noted that in a process for producing the treated porous carrier 24, a material roll (not shown) for supplying the porous carrier material may have a dimension that is greater than the final desired width of the porous carrier 24. For example, during processing to treat the porous carrier 24 with the release material 38 and the binding material 40, the porous carrier 24 may have a width of 1-1½ yards. Following B-staging of the binding material 40 on the porous carrier 24, the treated porous carrier 24 may be slit to form a plurality of interface tapes, each having a width of approximately 35 mm for application on a wrapped stator coil 14.

A wrapped stator coil 14 may be provided by forming an insulating tape structure incorporating the present mechanical interface layer 20 around a stator winding 16, step S-108 in FIG. 4. Initially, an insulating layer 18 comprising a dielectric tape, such as a glass backed mica paper tape, is wrapped about the stator winding 16. The glass backed mica tape may have a thickness of about 0.12 mm and is half-lap wrapped to form an insulating layer 18 having a thickness of about 4 mm. The treated porous carrier 24 impregnated with the release material 38 and the binding material 40, i.e., the interface tape, is then applied by wrapping it about the insulating layer 18 using a butt wrap, as is illustrated in FIG. 1. The treated porous carrier 24 has a thickness of approximately 0.15 mm and is applied in single layer around the insulating layer 18. A conductive or partially conductive layer 22 comprising a partially conductive tape, such as a silicon carbide filled varnish treated glass fabric tape, is wrapped about the interface layer 20. The partially conductive tape may have a thickness of about 0.15 mm and is half-lap wrapped to form an outer layer 22 having a thickness of about 3 mm. The wrapped stator coil 14 is placed in a stator slot and the assembly is subjected to a GVPI process to impregnate the wrapped stator coil 14 with an impregnating bonding resin and to substantially rigidly attach the outer layer 22 to the surface of the stator slot 12, as is known in the art. The impregnating bonding resin may comprise a low viscosity, 100% solids epoxy based thermoset resin with excellent electrical properties.

It should be noted that following treatment of the porous carrier 24 by the release material 38 and binding material 40, the porous carrier 24 still retains sufficient porosity to receive the impregnating bonding resin during the GVPI process. However, the release material 38 forms a non-bonding surface at the first side 28 of the porous carrier 24 such that the impregnating bonding resin does not adhere to the first side 28. The finished assembly is then heat cured to achieve maximum thermal and mechanical properties, where the curing process causes bonding between the surfaces that receive the impregnating bonding resin and activates the B-stage resin in the porous carrier 24 to substantially permanently adhere the second side 32 of the porous carrier 24 to the insulating layer 18.

In contrast, the opposing first side 28 of the porous carrier, while in contact against the inwardly facing surface 34 of the outer layer 22, provides a controlled bond strength and is releasably engaged with the inwardly facing surface 34. Hence, the release region 26 of the interface layer 20 permits relative movement between the interface layer 20 and the outer layer 22 when forces, such as thermal or vibrational forces, occur that tend to cause movement of the stator winding 16 relative to the stator slot 12. That is, while the non-release second side 32 of the porous carrier 24 remains in substantially immovable contact with the insulation layer 18, the opposing first side 28 provides a mechanical release interface to substantially prevent forces, i.e., stress, from being transferred through the interface layer 20 to the insulation layer 18 and stator winding 16.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A mechanical interface tape for a layered insulating tape structure configured to surround an electrical conductor, said interface tape comprising:
    a porous carrier comprising opposing sides including a release region located at a first side and a non-release region located at an opposite second side;
    wherein said release region is substantially treated with a release material for substantially inhibiting adhesion between said first side and an adjacent outer surface, and said non-release region is substantially untreated by said release material for substantially facilitating adhesion between said second side and an adjacent inner surface; and
    wherein, prior to associating said interface tape with an electrical conductor, said non-release region of said porous carrier is impregnated with a binding material for increasing the mechanical strength of said porous carrier and for increasing adhesion between said first surface and said adjacent inner surface.

2. The interface tape of claim 1, wherein said release material is applied to said release region of said porous carrier and diffuses toward said non-release region.

3. The interface tape of claim 2, wherein said release material permeates into and bonds within said release region, and said release material forms an outer non-bonding surface on said porous carrier.

4. The interface tape of claim 3, wherein said release material comprises a fluorinated resin.

5. The interface tape of claim 1, wherein said binding material comprises an epoxy based material.

6. The interface tape of claim 1, wherein said binding material comprises a polyester based material.

7. The interface tape of claim 1, wherein said non-release region of said porous carrier is substantially porous subsequent to said impregnation with said binding material for receiving an impregnating bonding resin in an impregnation process after said interface tape is wrapped on said electrical conductor.

8. The interface tape of claim 1, wherein said porous carrier comprises a non-woven material.

9. The interface tape of claim 8, wherein said porous carrier comprises a polymer.

10. The interface tape of claim 9, wherein said polymer material comprises a non-woven polyester material or an aramid material.

11. The interface material of claim 8, wherein said porous carrier comprises an E-glass material.

12. The interface tape of claim 1, wherein said interface tape is located in said insulating tape structure with said first side of said porous carrier engaged against an outer conductive layer, and said second side of said porous carrier engaged against an insulating dielectric layer.

13. The interface tape of claim 1, wherein said binding material is a B-stage resin that is partially cured prior to associating said interface tape with an electrical conductor.

14. A mechanical interface tape for relieving stress between an outer conductive layer and an inner insulating dielectric layer in a layered insulating tape structure surrounding an electrical conductor, said interface tape comprising:
    a porous non-woven carrier comprising opposing sides including a release region located at a first side and a non-release region located at an opposite second side; and
    wherein said release region is substantially treated with a release material for substantially inhibiting adhesion between said first side and an adjacent outer surface, and said non-release region is substantially untreated by said release material for substantially facilitating adhesion between said second side and an adjacent inner surface; and
    wherein, prior to associating said interface tape with an electrical conductor, said non-release region of said porous carrier is impregnated with a binding material for increasing the mechanical strength of said porous carrier and for increasing adhesion between said first surface and said adjacent inner surface.

15. The interface tape of claim 14, wherein said release material is applied to said release region of said porous carrier and diffuses toward said non-release region.

16. The interface tape of claim 15, wherein said release material permeates into and bonds within said release region, and said release material forms an outer non-bonding surface on said porous carrier.

17. The interface tape of claim 14, wherein said non-release region of said porous carrier is substantially porous subsequent to said impregnation with said binding material for receiving an impregnating bonding resin in an impregnation process after said interface tape is wrapped on said electrical conductor.

18. The interface tape of claim 14, wherein said interface tape is located in said insulating tape structure with said first side of said porous carrier engaged against said outer conductive layer, and said second side of said porous carrier engaged against said insulating dielectric layer.

19. The interface tape of claim 14, wherein said binding material is a B-stage resin that is partially cured prior to associating said interface tape with an electrical conductor.

* * * * *